(12) United States Patent
Theis et al.

(10) Patent No.: US 7,782,570 B1
(45) Date of Patent: Aug. 24, 2010

(54) INVERTED POCKET WELDING FOR DISK DRIVE HEAD SUSPENSIONS

(75) Inventors: Corey P. Theis, Gibbon, MN (US); Sameer S. Paranjape, Plymouth, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 746 days.

(21) Appl. No.: 11/686,171

(22) Filed: Mar. 14, 2007

(51) Int. Cl.
*G11B 5/48* (2006.01)

(52) U.S. Cl. .................................... 360/245.2

(58) Field of Classification Search .............. None
See application file for complete search history.

(56) References Cited

U.S. PATENT DOCUMENTS

| | | | | |
|---|---|---|---|---|
| 5,201,458 A | * | 4/1993 | Hagen | 228/199 |
| 5,748,409 A | * | 5/1998 | Girard et al. | 360/245 |
| 6,417,995 B1 | * | 7/2002 | Wu et al. | 360/245 |
| 6,717,099 B2 | | 4/2004 | Arya | |
| 6,870,708 B1 | * | 3/2005 | Fossum et al. | 360/244.5 |
| 6,900,966 B1 | | 5/2005 | Xu | |
| 7,065,858 B1 | * | 6/2006 | Zachmeyer | 29/603.06 |

* cited by examiner

*Primary Examiner*—Mark Blouin
(74) *Attorney, Agent, or Firm*—Faegre & Benson LLP

(57) ABSTRACT

A method for welding first and second head suspension components having opposite sides to one another. The first component has a weld pocket in one of its sides. The second component is positioned on the side of the first component opposite the side with the weld pocket. A weld site on the second component is aligned with the weld pocket on the first component. A weld at the weld site on the second component extends through the thickness of the second component and into the first component to a depth less than or about equal to a distance equal to the thickness of the first component less the depth of the weld pocket.

10 Claims, 1 Drawing Sheet

INVERTED POCKET WELDING FOR DISK DRIVE HEAD SUSPENSIONS

FIELD OF THE INVENTION

The invention generally relates to head suspensions for disk drives. In particular, the invention includes methods for welding together two or more components of a head suspension.

BACKGROUND OF THE INVENTION

Head suspensions, as used to suspend magnetic read/write heads over rotating disks in disk drive units, are well known and in widespread use. A head suspension is typically constructed from multiple components of varying thicknesses such as a load beam, a spring/hinge, a flexure, a base plate, and an actuator arm. The head suspension is manufactured by welding together two or more of these components by a series of spot welds. Lasers are often used to form the welds. Methods for welding together components of a head suspension are disclosed, for example, in U.S. Pat. No. 6,417,995 to Wu et al. and U.S. Pat. No. 6,900,966 to Xu.

Variations in thicknesses between components can present complications because the amount and/or duration of energy required for melting an area on a relatively thick component will be more than that required for melting an equivalent area on a relatively thin component. As such, welding thin component(s) to relatively thick component(s) requires increased laser energy per pulse delivered to the work piece for ensuring a proper weld. In general, the greater the amount of energy needed to form the weld, the greater the likelihood of detrimental consequences such as heat-induced deformation in the relatively thinner components, edge warping, dielectric and/or coverlay burning, increased levels of soot and splatter requiring more frequent cleaning of the welding system, increased molten weld pool resulting in larger weld diameter and material flow, and weld inconsistencies. Larger weld diameters reduce the real estate available for clamping and routing traces, and decrease product and flexure design flexibility There remains, therefore, a continuing need for methods utilizing less welding energy for welding together head suspension components. A method capable of producing weld spots of smaller size, especially in applications involving the welding of a relatively thin component to a relatively thick component, would be advantageous.

SUMMARY OF THE INVENTION

The present invention is a method for welding together two or more components of a head suspension for disk drives. The method can produce a relatively small diameter weld and improved penetration of the weld nugget.

In one embodiment of the present invention, the method includes the step of providing at least two metal components, each having opposite sides. The first component has a weld pocket in one of its sides. The second component is positioned on the side of the first component opposite the side with the weld pocket. A weld site on the second component is aligned with the weld pocket on the first component. A weld nugget is formed between the first and second components by applying welding energy to the weld site on the second component from the side of the second component opposite the weld pocket.

DETAILED DESCRIPTION OF THE PREFERRED EMBODIMENTS

Figure 1:
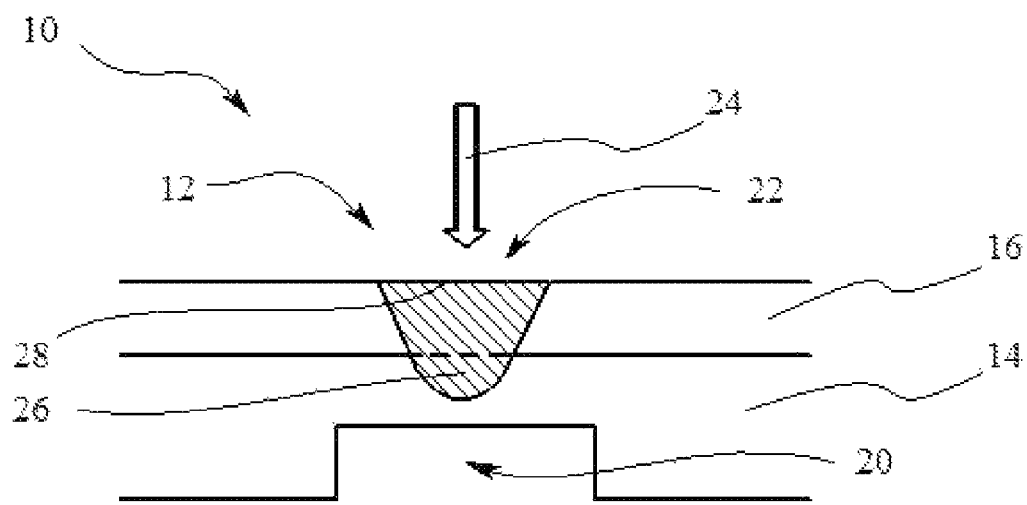
FIG. 1 is a cross-sectional view of a portion of a head suspension showing an example of a weld nugget produced when welding together two components in accordance with one embodiment of the invention.

FIG. 1 is a cross-sectional view of a portion of a head suspension 10 having weld joint 12, in accordance with one embodiment of the present invention. As shown, weld joint 12 is a 2-layer weld joint, such as a flexure weld joint, securing together a first component 14 and a second component 16 of head suspension 10. In the embodiment shown, first component 14 is thicker than second component 16. In an exemplary head suspension 10, first component 14 has a thickness greater than or equal to about 50 nm and second component 16 has a thickness less than or equal to about 25 µm. In other embodiments (not shown), the first component can be thinner than the second component. In still other embodiments (also not shown), both the first and second components have the same thickness. First and second components 14 and 16 can, for example, be one or more of a load beam, a hinge, a flexure, a base plate, or an actuator arm. Using conventional methods such as etching or punching, weld pocket 20 is formed on a surface of the first component 14. Weld pocket 20 is formed such that the thickness of first component 14 within weld pocket 20 is relatively less than the thickness of first component 14 outside weld pocket 20. One side of the second component 16 is positioned against the side of first component 14 opposite the side with weld pocket 20. A weld site 22 on second component 16 is aligned with weld pocket 20 on first component 14. Components 14 and 16 are welded together by applying welding energy 24, such as from a laser (not shown), to the weld site 22 on the side of second component 16 opposite the side of the first component 14 with weld pocket 20. The welding energy 24 melts a portion of both components 14 and 16 forming weld nugget 26 which fixedly attaches the components to one another.

The method of the invention offers particular advantages when the second component 16 is thinner than the first component 14 as shown in the embodiment described in connection with FIG. 1. Because the thickness of first component 14 at the weld pocket 20 is relatively less than the thickness of first component 14 outside weld pocket 20, the amount and/or duration of welding energy 24 required for melting an area of first component 14 adjacent to weld pocket 20 will be less than that required for melting an equivalent area of first component 14 outside weld pocket 20. As such, the level of welding energy 24 required for forming weld nugget 26 in an embodiment of the present invention will be relatively less than the level of welding energy required for forming a weld nugget in the absence of a weld pocket in the first component. Consequently, the amount of molten material in the weld pool can be decreased, thereby increasing the penetration of weld nugget 26 and resulting in a relatively smaller weld diameter 28. Certain advantages attributable to a smaller weld diameter include: an increase in the real estate available for tool clamping, and trace routings and margins; more flexibility in product design by minimizing the distances between the weld joint and critical features such as component locating features, formed features, or edge features; a decrease in the number of false calls at the vision module resulting from an increase in the area surrounding the weld joint for improved inspection; a reduction in the mass of component(s) from creating the weld pockets; an inherent decrease in the number of defects associated with welding thin components; and improved resonance and shock performance of the product.

Figure 2:
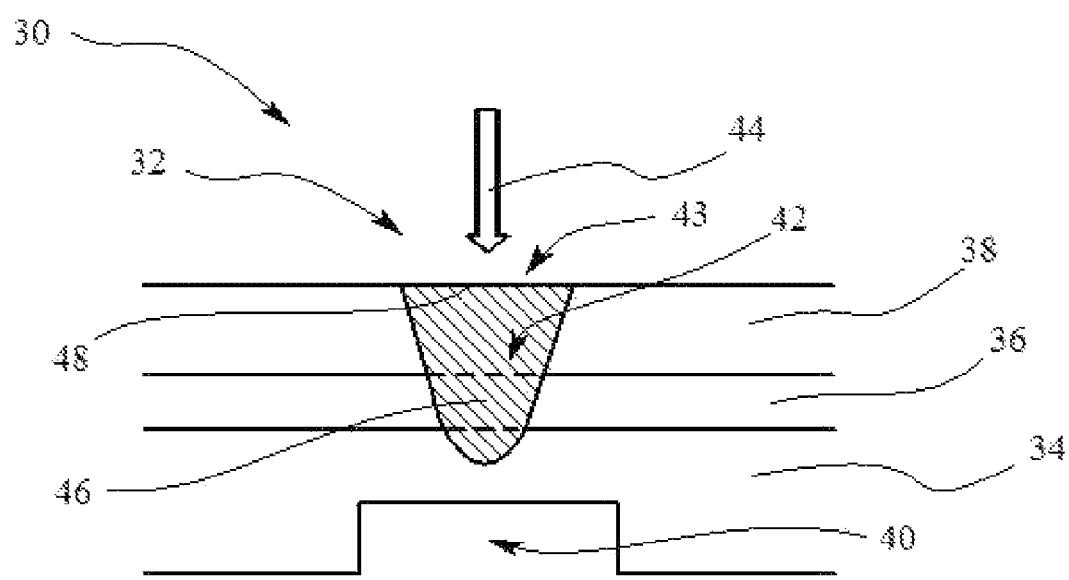
FIG. 2 is a cross-sectional view of a portion of a head suspension showing an example of a weld nugget produced when welding together three components in accordance with another embodiment of the invention.

FIG. 2 is a cross-sectional view of a portion of head suspension 30 having weld joint 32 in accordance with another embodiment of the present invention. As shown, weld joint 32 is a 3-layer weld joint for securing together three components: first component 34, second component 36, and third component 38. In the illustrated embodiment, first component 34 is relatively thicker than both second and third components 36 and 38, respectively; second component 36 is relatively thinner than both first and third components 34 and 38, respectively; and third component 38 is relatively thinner than first component 34 and relatively thicker than second component 36. In other embodiments (not shown), first component 34 has a thickness greater than or equal to about 50 μm, second component 36 has a thickness between about 25 μm and 50 μm, and third component 38 has a thickness less than or equal to about 25 μm. In still other embodiments (not shown), the first component can be thinner than the second and/or third components. In alternate embodiments (also not shown), the first, second, and third components have the same thickness. First, second, and third components 34, 36, and 38 can, for example, be one or more of a load beam, a hinge, a flexure, a base plate, or an actuator arm.

Using conventional methods such as etching or punching, weld pocket 40 is formed on a surface of the first component 34. Weld pocket 40 is formed such that the thickness of first component 34 within weld pocket 40 is relatively less than the thickness of first component 34 outside weld pocket 40. One side of second component 36 is positioned against the side of first component 34 opposite the side with weld pocket 40. A weld site 42 on second component 36 is aligned with weld pocket 40 on first component 34. And, one side of third component 38 is positioned against the side of second component 36 opposite the side with weld pocket 40 on first component 34. A weld site 43 on third component 38 is aligned with both weld pocket 40 on first component 34 and the weld site 42 on second component 36. First, second, and third components 34, 36, and 38, respectively, are welded together by applying welding energy 44, such as from a laser (not shown), to the weld site 43 on the side of third component 38 opposite the side of first component 34 with weld pocket 40. The welding energy 44 melts a portion of each component 34, 36, and 38, forming weld nugget 46 which fixedly attaches the three components to one another.

The method of the invention for securing together three components as described in connection with the embodiment shown in FIG. 2 offers advantages similar to those previously described in connection with the embodiment shown in FIG. 1. As with the embodiment of FIG. 1, the level of welding energy 44 required for forming weld nugget 46 in an embodiment of the present invention will be relatively less than the level of welding energy required for forming a weld nugget in absence of a weld pocket. Consequently, the amount of molten material in the weld pool will be decreased, thereby increasing the penetration of weld nugget 46 and resulting in a relatively smaller weld diameter 48. As previously discussed, there is a preference for smaller weld diameters because of the resultant advantages.

As discussed in the foregoing, the level of welding energy applied to the components effects the amount of molten material in the weld pool with consequential effect on the weld nugget and the weld diameter. In accordance with an embodiment of the present invention, the level of welding energy is adjusted to provide a weld diameter less than or equal to the diameter of the weld pocket. In accordance with another embodiment of the present invention, the level of welding energy is adjusted to ensure that the weld nugget extends into the material of the component having the weld pocket to a depth less than or equal to the thickness of the component at the location of the weld pocket. In one embodiment, the weld pocket can have diameters of about 200 μm and greater, and depths of about 25 μm and greater as dictated by the thickness of the component having the weld pocket. However, the diameters and depths of the weld pockets can be greater and/or smaller in other embodiments. The weld nugget can also be greater in diameter than the diameter of the weld pocket. The weld nugget also extends to a depth equal to and beyond the bottom of the weld pocket in other embodiments.

Although the invention has been described with reference to certain embodiments, those skilled in the art will recognize that modifications can be made to the form and detail without departing from the spirit and scope of the invention. In particular, although described in connection with welding together thick and thin components, the method is equally applicable for welding together two or more equally thin or equally thick components.

What is claimed is:

1. A method for welding head suspension components to one another, including:
   providing at least two metal head suspension components, including:
      a first component having opposite sides and a weld pocket in one of the sides; and
      a second component having opposite sides;
   positioning the second component on the side of the first component opposite the side with the weld pocket, with a weld site on the second component aligned with the weld pocket; and
   applying welding energy to the weld site on the second component from the side of the second component opposite the weld pocket to form a weld nugget between the first and second components.

2. The method of claim 1 wherein:
   providing metal head suspension components further includes:
      providing a third component having opposite sides; and
   the method further includes:
      positioning the third component on the side of the second component opposite the first component, with a weld site on the third component aligned with the weld pocket; and
      applying welding energy to the weld site on the third component from the side of the third component opposite the weld pocket to form a weld nugget between the first, second and third components.

3. The method of claim 1 wherein applying energy includes applying energy to produce a weld nugget having a diameter about equal to or less than a diameter of the weld pocket.

4. The method of claim 1 wherein applying energy includes applying energy to produce a weld nugget that extends into the first component to a depth less than or about equal to a distance equal to a thickness of the first component less a depth of the weld pocket.

5. The method of claim 1 wherein providing a first component includes providing a component having an etched or punched weld pocket.

6. The method of claim 1 wherein:
providing a first component includes providing one of a load beam, hinge, flexure, base plate and actuator arm; and
providing a second component includes providing another of a load beam, hinge, flexure, base plate and actuator arm.

7. The method of claim 1 wherein:
providing a first component includes providing a first component having a first thickness; and
providing a second component includes providing a second component having a second thickness that is less than the first thickness.

8. The method of claim 1 wherein applying energy includes applying energy to produce a weld nugget having a diameter less than about 200 μm.

9. A disk drive head suspension including:
a first component having opposite sides and a weld pocket in one of the sides;
a second component having opposite sides and located on the side of the first component opposite the weld pocket; and
a weld at a weld site on the second component that is aligned with the weld pocket on the first component, the weld extending through a thickness of the second component and into the first component to a depth less than or about equal to a distance equal to a thickness of the first component less a depth of the weld pocket.

10. The disk drive head suspension of claim 9 wherein:
the first component includes a component from the group including a load beam, hinge, flexure, base plate and actuator arm; and
the second component includes a component from the group including a load beam, hinge, flexure, base plate and actuator arm.

* * * * *